United States Patent [19]

Furay

[11] Patent Number: 5,738,533
[45] Date of Patent: Apr. 14, 1998

[54] ELECTRICAL CONNECTOR FASTENED TO A RIGID MEMBER FOR IMPROVED CONNECTOR RIGIDITY

[75] Inventor: David M. Furay, Boulder, Colo.

[73] Assignees: Integral Peripherals, Inc., Boulder, Colo.; Samsung Electronics Co., Ltd., Seoul, Rep. of Korea

[21] Appl. No.: 727,069

[22] Filed: Oct. 8, 1996

[51] Int. Cl.⁶ ............................................. H01R 9/09
[52] U.S. Cl. ................... 439/79; 439/573; 439/946
[58] Field of Search ......................... 439/76.1, 79, 80, 439/946, 541.5, 573, 74

[56] References Cited

U.S. PATENT DOCUMENTS

| | | | |
|---|---|---|---|
| 4,428,640 | 1/1984 | Pittman | 439/79 |
| 5,236,368 | 8/1993 | Adams et al. | 439/79 |
| 5,420,733 | 5/1995 | Knighton et al. | 360/97.01 |

OTHER PUBLICATIONS

IBM Technical Disclosure Bulletin vol. 32, No. 10B, pp. 300–304, Mar. 1990.

*Primary Examiner*—Neil Abrams
*Assistant Examiner*—T. C. Patel
*Attorney, Agent, or Firm*—Skjerven, Morrill, MacPherson, Franklin & Friel LLP; Forrest E. Gunnison

[57] ABSTRACT

A connector assembly including a connector mounted to a printed wiring board and attached to a head disk assembly for strain relief is provided. The connector includes a plurality of through hole pins or surface mounted pins soldered to the printed wiring board. In one embodiment the connector also includes a connector hole that is formed in and extends through the connector. In one embodiment the connector assembly also includes a plurality of screws which pass through the printed wiring board, the connector, and threaded holes of the head disk assembly.

23 Claims, 3 Drawing Sheets

ELECTRICAL CONNECTOR FASTENED TO A RIGID MEMBER FOR IMPROVED CONNECTOR RIGIDITY

FIELD OF THE INVENTION

This invention relates to connectors on printed wiring boards and in particular to a method of mounting a connector that prevents damage to a printed wiring board during insertion and removal of the connector's mating connection.

BACKGROUND OF THE INVENTION

Electrical connection between devices on different printed wiring boards is typically by way of multiple pin type connectors on each device. The devices may be mounted in a chassis and coupled through a cable which is inserted at each connector. For example, in a desktop IBM compatible computer, the hard disk is connected via a 40 pin ribbon cable from a connector on the printed wiring board of the hard disk to a connector on the motherboard or an interface card.

Alternatively, the device itself may be inserted into or removed from a fixed location where the mating connector is mounted. For example, a PCMCIA card can be inserted into or removed from a slot on a portable computer, where the connector on the PCMCIA card connects to the mating connector mounted within the slot.

As shown in FIG. 1(a), prior art connector 100 is attached to printed wiring board 110 by soldering pins 112 of connector 100 to holes 120 in printed wiring board 110. Printed wiring board 110 is connected to head disk assembly 130 (FIG. 1(b)) with screw 140. Therefore, any force used in attaching or detaching a mating connector (not shown) to connector 100 is placed on pins 112 of connector 100 and then transferred through pins 112 onto printed wiring board 110.

To insure a reliable connection, each hole on the female connector must grasp the pin on the male connector with a certain minimum pressure. Due to the grasping pressure on the pins, a large lateral force on the connector is required during insertion and removal. In addition, on small devices such as PCMCIA cards, angular insertion and removal may occur which adds additional shear forces onto the connector and the printed wiring board.

Pins 112 can withstand the lateral forces used during insertion and removal. Furthermore, the thickness of the printed wiring board, typically 0.032 inch (0.0812 cm) or greater, was enough to ensure adequate rigidity to withstand the strain from the shear forces involved in insertion and removal.

However, as demand for portability has increased, electronic devices must be manufactured in smaller dimensions. For example, the Notebook computer market demands PCMCIA hard drives in much smaller dimensions than was required on hard drives for desktop systems.

As shown in FIG. 2, a disk drive has various components 210 on the printed wiring board 110. One method to make smaller devices including smaller disk drives, is to use surface mount components. Surface mount components can increase the density of components on printed wiring board 110 since soldering pads for surface mount components are significantly smaller than those used for through hole components. In addition since no pins are required to pass through the board the overall height of the device is reduced. To further reduce the height of the device, printed wiring board 110 is made thinner.

However, surface mount components and thinner printed wiring boards present various problems for connectors. Surface mount connectors are not able to withstand as much force during insertion and removal as through hole connectors since the pins of surface mount components are thinner than those of through hole components. In addition, thin printed wiring boards, especially those less then or equal to 0.01 inch (0.025 cm) in thickness, become flexible and bend under the shear forces caused by insertion and removal of the device with the mating connector. Traces on the printed wiring board can be broken if the printed wiring board is subjected to bending, which in turn results in faulty connection between components.

Therefore, a connector is needed which can be used with a thin printed wiring board which can withstand the lateral and shear forces involved with insertion and removal of the device with a mating connector to prevent damage to the printed wiring board.

SUMMARY OF THE INVENTION

A connector assembly is disclosed with a connector attached to a printed wiring board and bound to a rigid component such as a head disk assembly for strain relief. In one embodiment the connector is formed with holes to allow screws to pass through the connector and attach to the rigid component. Forces on the connector are directed to the rigid component instead of the printed wiring board.

DESCRIPTION OF THE INVENTION

According to the principles of this invention, a novel connector assembly overcomes the shortcomings of prior art connector assemblies so as to reduce stresses, such as those encountered in the insertion or removal of a mating connector, on a printed wiring board. The connector assembly of this invention reduces the stress placed on the printed wiring board by a connector by transferring the stress to a rigid component.

Figure 1A:
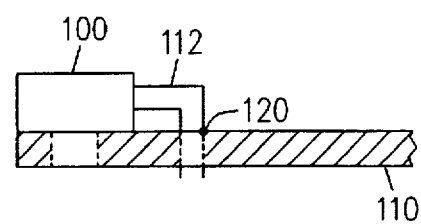
FIG. 1(a) is a side view of a conventional connector assembly.
Figure 1B:
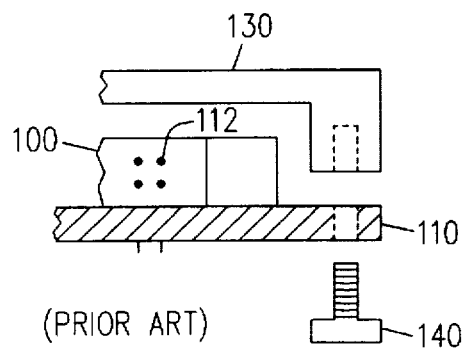
FIG. 1(b) is a front view of a conventional connector assembly.
Figure 2:
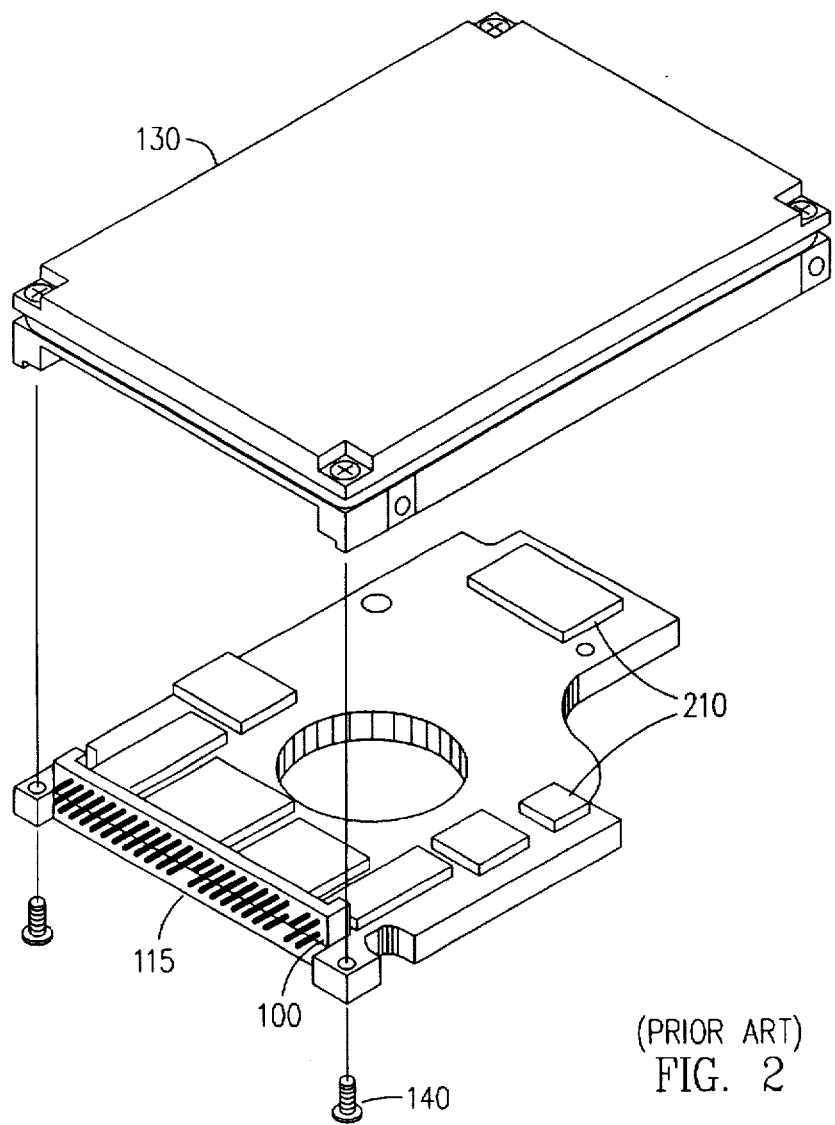
FIG. 2 is a perspective view off a conventional connector as used in a disk drive.
Figure 3B:
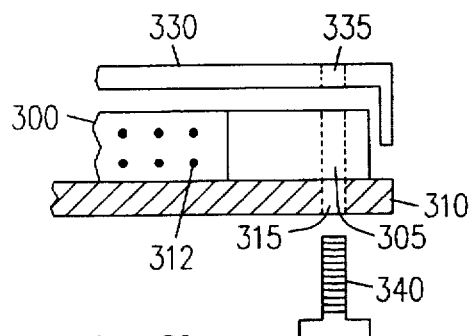
FIG. 3(b) is a front view of a connector arranged in accordance with one embodiment of the invention.
Figure 3A:
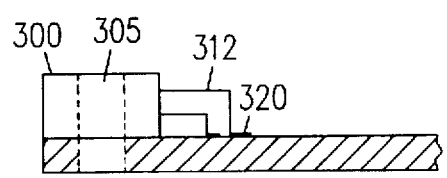
FIG. 3(a) is a side view of a connector arranged in accordance with one embodiment of the invention.

FIG. 3 illustrates a structure and assembly of a connector in accordance with one embodiment of the invention. Surface mount connector 300 with pins 312 is soldered to printed wiring board 310 at solder pads 320. A screw 340 passes through board mounting hole 315 in printed wiring board 310, connector mounting hole 305 in connector 300, and mounting hole 335 in a rigid component, such as head disk assembly 330. Screw 340 is held in place by a nut (not shown) adjacent head disk assembly 330, or alternatively, mounting hole 335 is threaded for connection to screw 340.

If lateral or shear forces are applied to connector 300, screw 340 transfers this force to the rigid component, such as head disk assembly 330. Head disk assembly 330 is formed of stronger material than that used in printed wiring board 310 and can withstand the forces from inserting or removing the mating connector. Screw 340 can be replaced with any rigid member, such as a metal dowel, so long as the rigid member transfers the lateral or shear forces to the rigid component.

A through hole connector can withstand greater lateral forces than a surface mount connector, however the through hole connector would still subject the printed wiring board to bending if the connector is not attached to a rigid component. Therefore, even a through hole connector would benefit from this invention.

Figure 4:
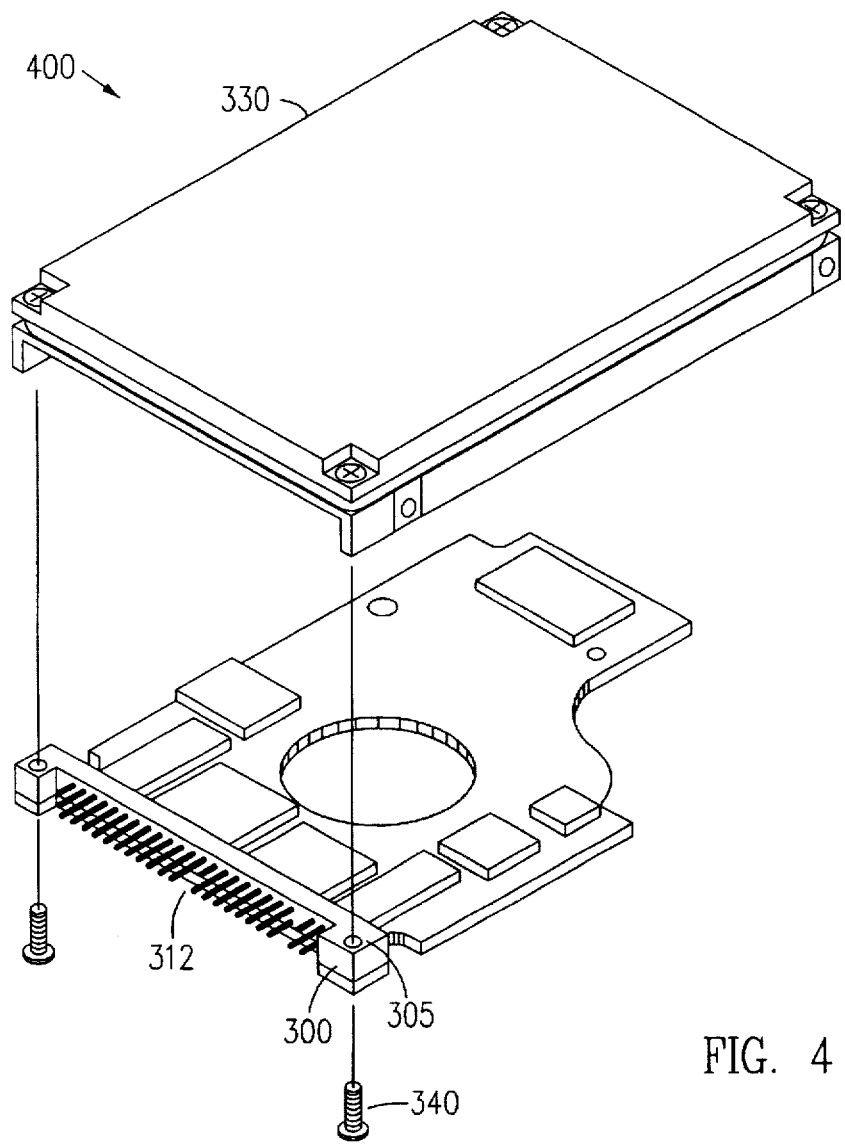
FIG. 4 is a perspective view of a connector used in a hard disk enclosure in accordance with one embodiment of the invention.

The invention is ideally suited for use in disk drives which already require rigid components such as a head disk assembly or a top cover for protection against dust contamination. Furthermore, the invention is especially beneficial for PCMCIA disk drives which are repeatedly inserted into and removed from a computer. As shown in FIG. 4, disk drive 400 is assembled with screws 340 passing through printed wiring board 310, connector 300, and head disk assembly 330. The majority of the force placed on the connector during insertion or removal of disk drive 400 is transferred to head disk assembly 330 through screws 340 and away from printed wiring board 310. Since printed wiring board 310 is not subjected to as much force as wiring boards in conventional connector assemblies, printed wiring board 310 can be much thinner than other wiring boards. For example, printed wiring board 310 have a thickness of less than or equal to 0.010 in.

Figure 5A:
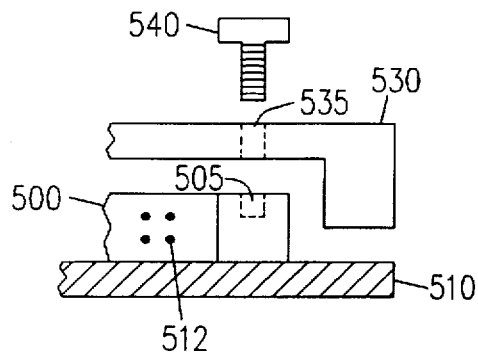
FIG. 5(a) is a side view of a connector arranged in accordance with a second embodiment of the invention.
Figure 5B:
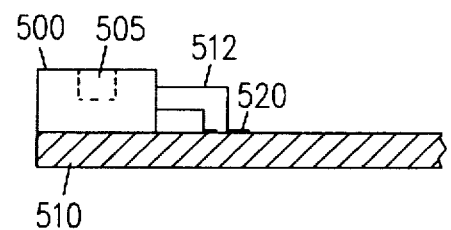
FIG. 5(b) is a front view of a connector arranged in accordance with a second embodiment of the invention.

FIG. 5 illustrates a structure and assembly of a connector in accordance with a second embodiment of the invention. Surface mount connector 500 with pins 512 is soldered to printed wiring board 510 at solder pads 520. A screw 540 passes through mounting holes 535 of a rigid component, such as head disk assembly 530, into threaded connector mounting hole 505 in connector 500. Screw 540 is held in place by threaded connector mounting hole 505.

If lateral or shear forces are applied to connector 500, screw 540 transfers this force to a rigid component, such as head disk assembly 530. Head disk assembly 530 is formed of stronger material than that used in printed wiring board 510 and can withstand the forces from inserting or removing the mating connector. Screw 540 can be replaced with any rigid member, such as a metal dowel; so long as the rigid member transfers the lateral or shear forces to the rigid component.

Figure 6:
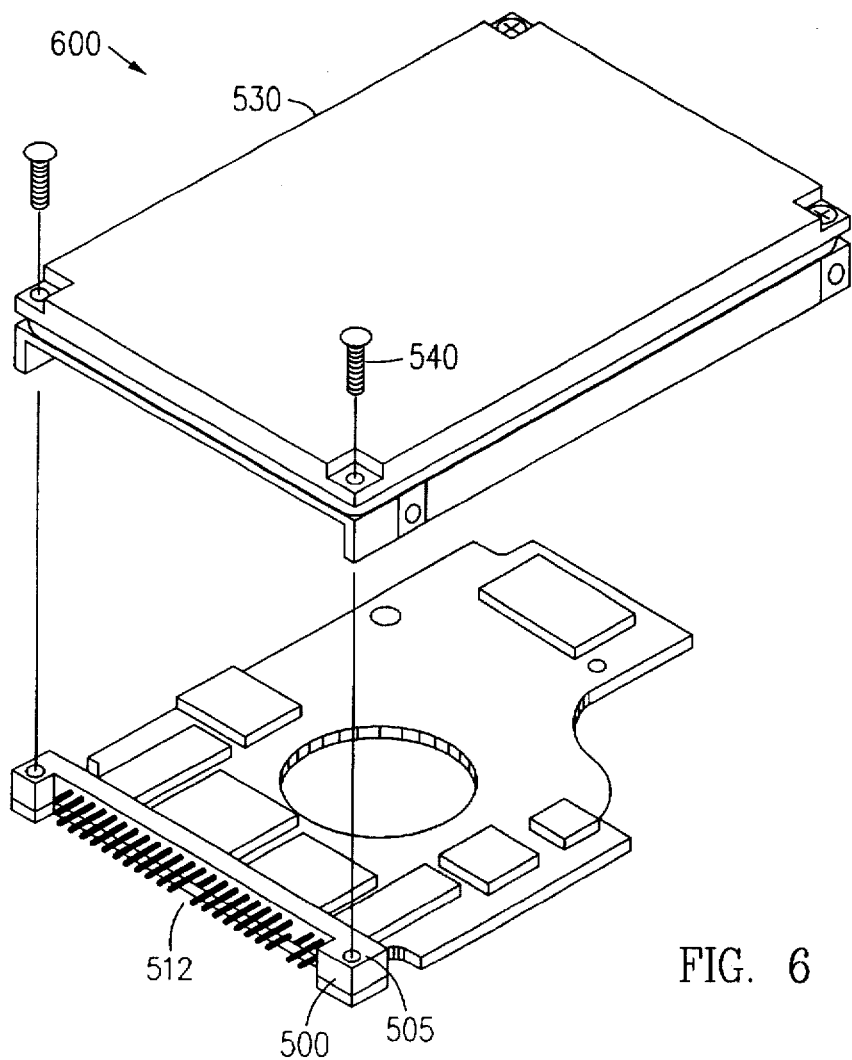
FIG. 6 is a perspective view of a connector used in a hard disk enclosure in accordance with a second embodiment of the invention.

FIG. 6 shows disk drive 600, assembled with screws 540 passing through head disk assembly 530 into connector 500. Any force placed on the connector during insertion or removal of disk drive 600 is transferred to head disk assembly 530 through screws 540 and away from the printed wiring board 510.

In the various embodiments of this invention, a connector assembly has been described that eliminates the shortcomings of prior art connector assemblies which allowed lateral and shear forces to be transmitted to the printed wiring board. The various embodiments described herein are illustrative only of the principles of this invention and are not intended to limit the invention to the particular implementations described. Those skilled in the art will be able use the principles of this invention in any application with a connector attached to a printed wiring board.

I claim:

1. A connector assembly comprising:
   a connector having a first surface and a second surface;
   a printed wiring board coupled to said connector;
   a head disk assembly attached to said connector; and
   a plurality of rigid members, said rigid members passing through said printed wiring board, said connector from said first surface to said second surface, and said head disk assembly, wherein said rigid members transfer forces applied on said connector to said head disk assembly and reduce stress placed on said printed wiring board.

2. The connector assembly of claim 1, wherein said connector comprises a plurality of surface mounted pins, said surface mounted pins being soldered to said printed wiring board.

3. The connector assembly of claim 1, wherein said connector comprises a plurality of through hole pins, said through hole pins being soldered to said printed wiring board.

4. The connector assembly of claim 1, wherein said printed wiring board has a thickness of less than or equal to 0.010 in.

5. The connector assembly of claim 1, wherein said connector assembly is used in a PCMCIA card.

6. The connector assembly of claim 1, wherein said head disk assembly is larger than said printed wiring board.

7. The connector assembly of claim 1, wherein said connector is between said printed wiring board and said head disk assembly.

8. The connector assembly of claim 1, wherein said rigid members are screws.

9. The connector assembly of claim 8, wherein said screws pass through a plurality of threaded holes in said head disk assembly.

10. The connector assembly of claim 8, further comprising a plurality of nuts attached to said screws.

11. The connector assembly of claim 1, wherein said connector includes a connector hole formed in said connector.

12. The connector assembly of claim 11, wherein said connector hole extends from said first surface of said connector to said second surface of said connector.

13. A connector assembly comprising:
   a connector having a connector hole formed in said connector, a first side and a second side;
   a printed wiring board attached to said connector;
   a head disk assembly; and
   a rigid member extending through said head disk assembly into said connector hole from said first side of said connector, wherein said rigid member transfers forces applied on said connector to said head disk assembly and reduces stress place on said printed wiring board.

14. The connector assembly of claim 13, wherein said connector has a plurality of surface mount pins and wherein said surface mount pins are soldered to said printed wiring board.

15. The connector assembly of claim 13, wherein said connector assembly is used in a PCMCIA card.

16. The connector assembly of claim 13, wherein said rigid member passes through a threaded head disk assembly hole in said head disk assembly.

17. The connector assembly of claim 13, wherein said head disk assembly is larger than said printed wiring board.

18. The connector assembly of claim 13, wherein said connector is between said printed wiring board and said head disk assembly.

19. The connector assembly of claim 13, wherein said rigid member does not touch said printed wiring board.

20. The connector assembly of claim 13, wherein said connector hole extends from said first side of said connector to said second side of said connector.

21. The connector assembly of claim 20, wherein said printed wiring board has a board hole and said rigid member passes through said board hole of said printed wiring board.

22. The connector assembly of claim 13, wherein said rigid member is a screw.

23. The connector assembly of claim 22, further comprising a nut attached to said screw.

* * * * *